United States Patent [19]
Lee

[11] Patent Number: 4,973,295
[45] Date of Patent: Nov. 27, 1990

[54] STEPLESS VARIABLE RATIO TRANSMISSION

[75] Inventor: Paul Z. Lee, Tallahassee, Fla.

[73] Assignee: Gabrielle Reng-Yi Wu Lee, Tallahasee, Fla.

[21] Appl. No.: 331,387

[22] Filed: Mar. 31, 1989

[51] Int. Cl.$^5$ ............................................ F16H 59/06
[52] U.S. Cl. ...................... 475/153; 475/329
[58] Field of Search ................ 74/674, 675, 681, 724, 74/789, 793, 866, 458, 687, 691, 693; 475/153, 296, 329

[56] References Cited

U.S. PATENT DOCUMENTS

| | | | |
|---|---|---|---|
| 2,390,240 | 12/1945 | De Lancey | 74/687 |
| 2,451,998 | 10/1948 | Wahlberg et al. | 74/458 |
| 2,455,487 | 12/1948 | Hoffar | 74/458 |
| 2,520,784 | 8/1950 | Schucksupp | 74/458 |
| 2,940,337 | 6/1960 | Kalb | 74/675 |
| 3,220,284 | 11/1965 | Horvath | 74/674 |
| 3,224,298 | 12/1965 | Hill | 74/688 |
| 3,283,612 | 11/1966 | Densham | 74/687 |
| 3,303,725 | 2/1967 | Knosp | 74/740 |
| 3,304,808 | 2/1987 | Grant | 74/760 |
| 3,404,584 | 10/1968 | Trautmann | 74/687 |
| 3,427,899 | 2/1969 | Gunderson et al. | 74/687 |
| 3,529,493 | 9/1970 | Egli | 74/785 |
| 3,620,102 | 11/1971 | Korner | 74/796 |
| 4,109,550 | 8/1978 | Murayama | 74/691 |
| 4,491,035 | 1/1985 | Gleasman et al. | 74/715 |
| 4,495,835 | 1/1985 | Gleasman et al. | 74/715 |
| 4,590,561 | 5/1986 | Abo et al. | 74/866 |
| 4,662,245 | 5/1987 | Taylor | 74/785 |
| 4,724,721 | 2/1988 | Gleasman et al. | 74/715 |
| 4,732,053 | 3/1988 | Gleasman et al. | 74/665.2 |
| 4,776,235 | 10/1988 | Gleasman et al. | 74/720.5 |
| 4,776,236 | 10/1988 | Gleasman et al. | 74/720.5 |

FOREIGN PATENT DOCUMENTS

| | | | |
|---|---|---|---|
| 649015 | 7/1927 | France | 74/675 |
| 272206 | 5/1927 | United Kingdom | 74/675 |

OTHER PUBLICATIONS

Mechanism and Dynamics of Machinery, 4th Edition, by Hamilton H. Mabie & Charles F. Reinholtz, 1987, p. 234.
Bargo, Jr., "Tank Dozers Turn on a Dime With New Alt Gear Steering", Popular Science, Jul. 1985.
Parker "Differential Gearings Controlling High-Power Transmissions", Machine Design, Apr. 21, 1988.

Primary Examiner—Dwight Diehl
Assistant Examiner—Khoi Q. Ta
Attorney, Agent, or Firm—Kerkam, Stowell, Kondracki & Clarke

[57] ABSTRACT

A stepless variable ratio transmission is provided having an input drive axle connected to a sun gear of a planetary gear assembly, an output axle connected to a ring gear of the planetary gear assembly, and a planet or pinion carrier rotatably supporting a plurality of planet or pinion gears thereon, the pinion gears being meshingly engaged with the sun gear and the ring gear. A control means is also provided for controlling the rotational speed of the planet carrier, the control means comprising a worm gear driven by a servo or stepping motor, which is in turn controlled by a computer which senses various conditions in determining the desired transmission ratio. The planet carrier is provided with a plurality of gear teeth along a peripheral edge thereof to meshingly engage the worm gear. The design of the worm gear and the planet carrier is advantageously selected to improve the efficiency of the system by minimizing the power required to effect the rotational speed control of the planet carrier.

18 Claims, 3 Drawing Sheets

STEPLESS VARIABLE RATIO TRANSMISSION

BACKGROUND OF THE INVENTION

1. Field of the Invention

The present invention relates to a stepless transmission, and more particularly to a stepless variable ratio transmission which is electronically controlled.

2. Description of Related Art

Heretofore, various devices have been disclosed which provide, in one manner or another, a transmission having a substantially continuous or "stepless" transmission ratio or gear speed change. Such transmissions suffer from one or more disadvantages, and one drawback in particular that is common to these transmissions is that they have relatively low efficiencies.

Those skilled in the art continue to strive to attain a design for a high-efficiency stepless transmission, particularly for vehicular applications. Examples of types of stepless transmissions propounded for use in automobiles or other vehicles include the expansion pulley type, the hydrostatic transmission, the hydrodynamic transmission, and tractional and frictional transmissions. The expansion pulley type, a contemporary example of which comprises hydraulically controlled expansion sheaves and a metal belt, has certain intrinsic disadvantages, primarily due to belt slippage. The other transmission types noted above all suffer from, in addition to low efficiency, either limited power and speed rates, bulkiness, noisy operation or excessive cost.

Planetary gear assemblies have heretofore been proposed for use in transmissions having a continuous or stepless variable transmission ratio. Several designs employing the general concept of using planetary gear assemblies in such stepless transmissions have been disclosed or depicted in the prior art.

A first group of these planetary gear stepless transmissions operate by splitting the power of the prime mover (motor) into two routes or two streams of power flow. This group of patents includes U.S. Pat. No. 4,109,550, to Murayama; U.S. Pat. No. 4,662,245, to Taylor; U.S. Pat. No. 3,427,899, to Gunderson; U.S. Pat. No. 3,404,584, to Trautman; U.S. Pat. No. 3,304,803, to Stockton; U.S. Pat. No. 3,303,725, to Knosp; U.S. Pat. No. 3,283,612, to Densham; and U.S. Pat. No. 3,224,298 to Hill. The operation of such transmissions generally involves varying a speed or movement in one of the two streams of power flow whereby an output terminal in the system obtains a variable ratio with respect to the prime mover. Such systems generally involve an even or nearly even distribution of power into the two streams of power flow. Thus, the variable ratio at the output terminal is obtained essentially controlling one stream of power flow with another of equal magnitude or on the same order of magnitude. Control systems using a control means which requires power comparable to the power flow to be controlled are generally considered to be of poor design, as approximately half of the available power is consumed in providing the variable ratio control.

A second group of planetary gear stepless transmissions operate by applying a braking force to a third terminal to change the transmission ratio between a first (input) terminal or prime mover and a second (output) terminal. Patented devices falling into this group include U.S. Pat. No. 3,220,284 to Horvath, and U.S. Pat. No. 3,529,493 to Egli.

A third kind of double differential system (described by Bargo, Popular Science, July, 1985) has been used to steer continuous track vehicles which controls power output to two different branches from thence the left side and right side tracks will obtain different speed and the control means is a self-locking worm gear.

This type of transmission generally performs adequately for applications where speed adjustment is only temporary, such as on continuous track vehicles, e.g., tanks or bulldozers. This type of variable ratio control has several disadvantages which substantially reduce its desirability in applications where the control is to be used for extended periods of time, namely excessive wear on moving parts, heat buildup, and high energy loss. These disadvantages result in very low operating efficiency and would lead to short service life, due to the basic operating principles employing energy dissipation from one power route to control the transmission ratio.

In the devices disclosed in all of the above-identified patents, the power needed to drive the variable speed mechanism or the braking mechanism is drained from the input prime motor. Sufficiently precise ratio control may thus not be attained in a vehicular transmission application, and the transmission ratio would be easily influenced by sudden changes of load, for example, when the vehicle drive wheels encounter stones or potholes on the road.

It is therefore a principal object of the present invention to provide high efficiency stepless variable ratio transmission having a relatively simple mechanical structure and being capable of operating at sufficiently high speed and high power to be used in vehicular applications.

It is a further object of the present invention to provide a high efficiency stepless variable ratio transmission having ratio control means especially suitable for use with electronic or computer control input.

SUMMARY OF THE INVENTION

The above and other objects of the present invention are accomplished by providing a transmission having an input or driving axle, an output or driven axle, and a planetary gear assembly wherein the transmission ratio can be varied in a substantially stepless or continuous manner using means for controlling the rotational speed of one of the elements of the gear assembly. The invention advantageously uses a worm-gear combination, the worm being driven by a servo motor or stepping motor having an operating power requirement on the order of one-half to four horsepower, or one to two orders of magnitude less than the power stream being controlled.

The invention advantageously employs a sun gear affixed to the input axle, a ring gear affixed to the output axle, and a plurality of planet gears supported by a planet carrier, the planet gears meshingly engaging both the sun gear and the ring gear. The planet carrier is advantageously provided with gear teeth extending around a peripheral edge thereof, the gear teeth being adapted to engage the worm which is driven by the servo or stepping motor.

The worm controls the rotational speed of the planet carrier based on one or more predetermined sensed signals including the speed of the input axle and sun gear. The worm is advantageously designed to have an angle of progression or advance of its thread whose tangent is substantially equal to the coefficient of friction between the worm and the gear teeth of the planet carrier. When a worm of this design is used, very little power is required to advance the planet carrier at a desired rotational speed, or to hold the planet carrier stationary. The worm thus provides the ability to vary the transmission ratio of the system substantially continuously from the lower to the upper theoretical limits of the drive train using a servo or stepping motor which has a power requirement which is one or more magnitudes less than the power transferred between the input and output axles.

The present invention may advantageously comprise an input drive means for rotating a sun gear fixedly disposed thereon, output means for transferring rotation motion to a predetermined load which is operatively connected thereto, a planetary gear assembly comprising, the sun gear, a plurality of pinion gears rotatably disposed on a planet carrier, and a ring gear surrounding the plurality of pinion gears in meshing engagement, the plurality of pinion gears further being in meshing engagement with the sun gear, the ring gear of the planetary gear assembly being operatively connected to the output means, and means for controlling a relative rotational movement of the planet carrier independently of the input means, the independent control means comprising a worm gear operatively connected to the planet carrier and a means for driving the worm gear responsive to at least a first sensed condition, and means for sensing the at least first sensed condition operatively connected to the driving means.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention, taken in conjunction with the accompanying drawings wherein like reference characters represent like parts throughout the several views, and wherein.

DETAILED DESCRIPTION OF THE PREFERRED EMBODIMENTS

Figure 1:
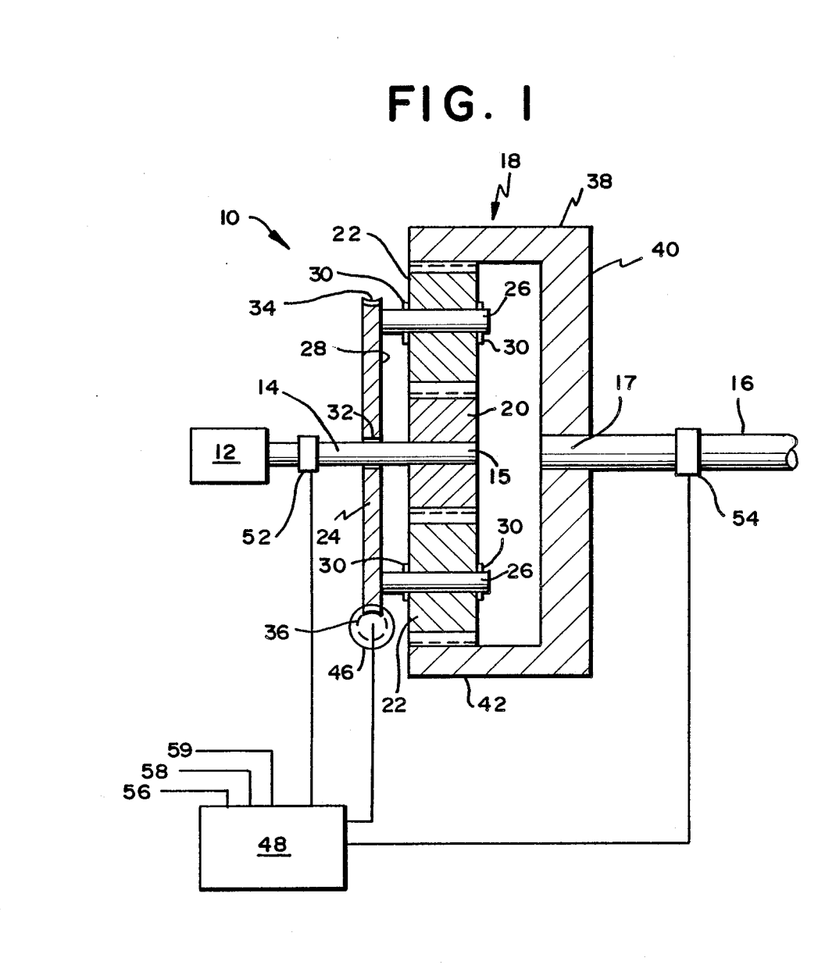
FIG. 1 is a cross-sectional view of the stepless variable ratio transmission according to a preferred embodiment of the present invention.

Referring initially to FIG. 1, the stepless variable ratio transmission of the present invention is indicated generally by numeral 10. Transmission 10 is provided to transfer power from a prime mover or power source 12, shown schematically, by way of input or drive axle 14, to output or driven axle 16. The prime mover may be one of various types of power providers, depending on the service in which the transmission 10 is used. In an automobile, the prime mover 12 would be the engine, and the engine's crankshaft would be operatively coupled to input axle 14. The output axle 16 will be, in operation, coupled to a load which, in the automobile example noted above, would be the drive wheels of the vehicle.

The construction of the transmission 10 is relatively uncomplicated. In the depicted preferred embodiment, a planetary gear assembly 18 operatively connects the input axle 14 with the output axle 16. The planetary gear assembly 18 in the present invention has a sun gear 20 disposed at a distal end 15 of input axle 14. Sun gear 20 is to be fastened to input axle 14 in a manner such that no relative rotation between the two components is permitted or, through a hydrodynamic or mechanical coupling which can absorb sudden shock of torque change. This can be accomplished in one of several ways well known in the art, an example of which is a key and slot arrangement (not shown).

Figure 2:
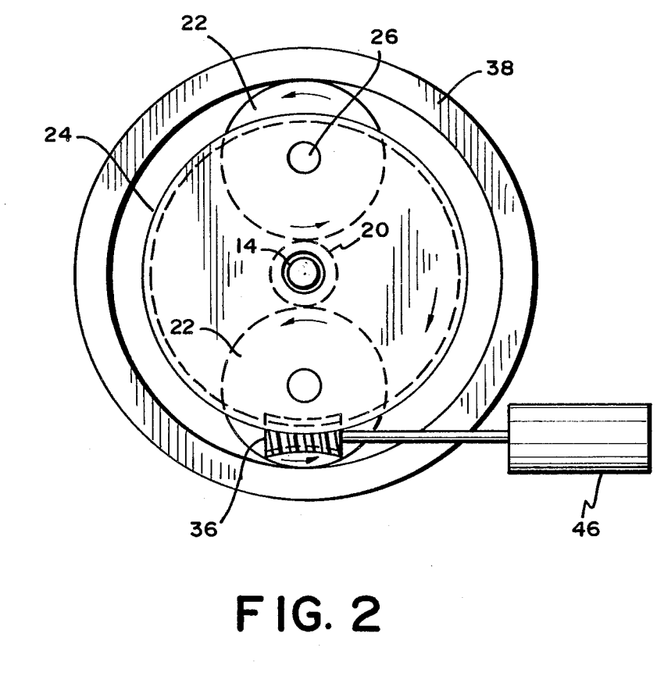
FIG. 2 is a substantially schematic view of the stepless variable ratio transmission according to the present invention, as viewed from the input axle side of FIG. 1.

Sun gear 20 is revolvingly surrounded by and meshingly engages a plurality of planet gears or pinions 22, the depicted embodiment in FIGS. 1 and 2 employing two diametrically opposed planet gears 22, although it is envisioned that more than two may be employed as well. Planet gears 22 are connected to and supported by planet carrier 24 by a pair of associated pins or shafts 26 extending from a first planar surface 28 of the planet carrier 24. Planet gears 22 are connected to pins 26 in a manner allowing the planet gears to rotate about the pins. Collars 30 are depicted as means for retaining the planet gears in their proper positions along the longitudinal extent of the pins 26. It can be readily appreciated that sleeve-like bearings (not shown) or other known friction reducing devices could be employed on pins 26 in order to permit planet gears to rotate more freely on the pins. Similarly, it can be readily appreciated that the planet gears may be fixedly mounted to the shafts or pins 26, with the pin-to-planet carrier connection providing the capability for the planet gears to rotate about the longitudinal axis of the respective pins.

Planet carrier 24, which is substantially spider-, or disc-shaped, has a bore 32 extending through its center of a size sufficient to allow input axle 14 to extend through the planet carrier 24 from the prime mover 12 to the sun gear 20. Bore 32 is of a sufficiently large diameter such that a small gap is present between input axle 14 and planet carrier 24, enabling these two components to freely rotate relative to each other. In instances, the planet carrier 24 may be mounted on input axle 14 by a suitable bearing means, while retaining the capability of substantially free relative rotation between these components. The peripheral edge 34 of planet carrier 24 is toothed such that the planet carrier is adapted to meshingly engage a worm wheel 36, the operation of which will be discussed in more detail later in the specification.

Ring gear 38 encircles planet gears 22, in meshing engagement therewith. The depicted ring gear 38 comprises a substantially planar disc-like backing plate 40 and an annular extension 42 having a set of gear teeth around an interior periphery thereof. Ring gear 38 is secured to a distal end 17 of output axle 16, the proximal end of that axle (not shown) being coupled to a load. Ring gear 38 and output axle 16 are not relatively rotatable, the connection therebetween being of the well known key and slot type or other suitable means.

The transmission 10 depicted in FIG. 1 and schematically in FIG. 2 has a servo or stepping motor, shown schematically at 46, which is used to drive worm wheel 36 at a continuously variable rotational speed, the desired speed being determined by one or more measured, sensed, or otherwise detected conditions. Servo or stepping motors are known in the art as devices used in applications requiring precise speed control, and are especially well suited for use in combination with computer-generated signals for controlling the rotational speed of the motor. Servo or stepping motors suitable for use with the present invention are commercially available. It is estimated that the power requirements of such a motor for use with an automobile having a prime mover on the order of 100-200 horsepower, and with the transmission 10 of the present invention, will be on the order of one-half to four horsepower, or on the order of 0.25 percent to 4 percent of the prime mover, as will be discussed further at a later point in this specification. Servo or stepping motor 46 is preferably connected to the electrical system of the vehicle (not shown) from which it extracts the power necessary to drive the worm 36. Thus, in addition to requiring only a small amount of power to drive worm 36, the servo or stepping motor operates independently of, and does not require mechanically coupled power from the input power drive train.

FIG. 1 also depicts, in schematic form, a computer 48, the output line 50 of which is operatively connected to servo or stepping motor 46. The computer 48 is depicted as receiving signals from an input speed encoder 52 disposed at input axle 14, an output/vehicle speed encoder 54, and other data input sources. Examples of these would be a signal 56 representative of the detected pedal position of an accelerator pedal, a signal 58 representative of a torque measurement indicating the amount of torque required to overcome the load, and a signal 59 indicative of a measured air temperature. The computer, based on all of these data inputs, provides a signal to the servo or stepping motor, preferably in the form of pulses, which cause the motor to turn the worm wheel 36 either at a faster or slower rate.

The basic working principle of the planetary gear assembly 18 in the stepless variable ratio transmission of the present invention can best be explained by briefly discussing transmission ratios. In a planetary gear train, the transmission ratio between the input axle 14 and the output axle 16 can be determined by the ratio of the radii of the sun gear, the planet gears and the ring gear. The transmission ratio can be expressed as a ratio of the rotational speed (in revolutions per minute or RPM) of the output axle to the rotational speed of the input axle. Further, in a planetary gear train of the type depicted in FIG. 1, wherein the sun gear 20 and input axle 14 rotate as a single member, as do ring gear 38 and output axle 16, the transmission ratio between the input and output at those axles has a theoretical lower limit where the planet carrier is fixed, and a theoretical upper limit where the rotational speed of the planet carrier is such that the rotational speed of the output axle equals zero RPM, wherein the transmission ratio approaches infinity.

For the planetary gear assembly depicted in FIG. 1, the equation representing the relationship of the rotational speeds of the input axle 14, output axle 16, and planet carrier 24 is as follows:

$$f_{16} = -(r_{14}/r_{16})f_{14} + [2+(r_{14}/r_{16})]f_{24} \quad (1)$$

wherein $f_{14}$, $f_{16}$, and $f_{24}$, represent the speed (in RPM) of the input axle 14, output axle 16, and planet carrier 24, respectively, and $r_{14}$ and $r_{16}$ represent a radius of the pitch circle of sun gear 20 and ring gear 38, respectively. The negative sign in equation (1) indicates that the ring gear rotates in a direction opposite that of the sun gear. From this equation, it can be seen that the maximum (most negative) transmission ratio, $f_{14}/f_{16}$, occurs where $f_{24}$, the speed of the planet carrier, is equal to zero, the transmission ratio in that condition being equal to $-(r_{16}/r_{14})$.

Additionally, it can be determined from this equation the speed at which planet carrier 24 must rotate in order to produce no rotary motion at output axle 16. In this case, $f_{16}$ would be equal to zero, and solving equation (1) for $f_{24}$, the equation yields:

$$f_{24} = f_{14}\{[r_{14}/(2 \times r_{16})]+1\} \quad (2).$$

Thus, if planet carrier 24 rotates at a speed having a relationship with the rotational speed of input axle 14 as indicated in equation (2), no output rotary motion will be transferred to output axle 16, and the transmission ratio, $f_{14}/f_{16}$, approaches infinity as $f_{16}$ approaches zero.

It can thus be seen that the planetary gear assembly 18 of the present invention provides an opportunity to obtain a wide range of transmission ratios by controlling the rotational speed of the planet carrier 24, more specifically, by changing the rotational speed of the planet carrier 24 relative to the rotational speed of the input axle 14 and sun gear 20. As the speed $f_{24}$ of the planet carrier 24 is varied between zero and the speed expressed in equation (2), the transmission ratio between the output and input axles will be changed progressively and steplessly. Table I below presents an example of the effect of changes in the relative speed of the planet carrier $f_{24}$, with respect to the speed $f_{14}$ of input axle 14, for a gear assembly 18 having a predetermined gear geometry wherein the ratio between the sun gear pitch radius $r_{14}$ and ring gear pitch radius is one to three. The table displays the speeds $f_{24}$ and $f_{16}$ of planet carrier 24 and output axle 16 both in actual numerical values (RPM) and as a ratio compared to input axle speed, $f_{14}$, assumed to be a constant 1000 RPM for purposes of illustration. The transmission ratio variation range for practical purposes may be limited to a factor of about 10 for automotive application and the variation range may be raised up to a factor of about 1000 for special applications.

TABLE I

| | [$f_{14}$ = 1,000 rpm] | | |
|---|---|---|---|
| $f_{24}$:$f_{14}$ | $f_{14}$:$f_{16}$ | $f_{24}$ (rpm) | $f_{16}$ (rpm) |
| 0 | 3.00:1 | 0 | 333 |
| 0.01 | 3.25:1 | 10 | 307 |
| 0.02 | 3.50:1 | 20 | 284 |
| 0.03 | 3.83:1 | 30 | 261 |
| 0.04 | 4.20:1 | 40 | 238 |
| 0.05 | 4.60:1 | 50 | 215 |
| 0.06 | 5.20:1 | 60 | 192 |
| 0.07 | 5.90:1 | 70 | 169 |
| 0.08 | 6.80:1 | 80 | 146 |
| 0.09 | 8.30:1 | 90 | 123 |
| 0.10 | 10.0:1 | 100 | 100 |
| 0.11 | 12.9:1 | 110 | 77 |
| 0.12 | 18.5:1 | 120 | 54 |
| 0.13 | 32:1 | 130 | 31 |
| 0.14 | 125:1 | 140 | 8 |
| 0.141 | 500:1 | 141 | 2 |
| 0.1428 | >1000:1 | 142.87 | 0 |

An important aspect of the present invention is the provision for a very precise planet carrier speed control which requires a very small amount of power in comparison to the power being transmitted from input axle 14 to output axle 16, the speed control being responsive to rotational speed measurements of the input axle, the output axle, and other selected parameters.

The means for controlling the rotational speed of the planet carrier according to a preferred embodiment of the present invention comprises the aforementioned worm 36 driven by servo or stepping motor 46, and the gear teeth 60 disposed on the peripheral edge of the planet carrier which are adapted to meshingly engage the gear tooth or gear thread 62 of the worm 36.

It has been determined, in accordance with the present invention, that the power requirements for driving the worm 36 in controlling the rotational speed of the planet carrier may be kept to a minimum, on the order of one-half to four horsepower, by providing a worm 36 having a particular angle of thread progression or advance Q (FIGS. 3 and 4) wherein worm 36 and gear teeth 60 mesh at an angle substantially equal to a "critical angle". This critical angle is where the tangent of that angle (tan Q) is equal to the coefficient of friction $C_f$ between the contacting surfaces of the worm gear thread 62 and the gear teeth 60 on the peripheral edge of the planet carrier.

The selection of the angle of thread progression for worm gear 36 can best be explained by referring momentarily back to FIG. 2. If the normal rotary motion of input axle 14 and sun gear 20 is in a clockwise direction, the design of the gear train will cause the ring gear 38 and the output axle to be rotated in a counterclockwise direction. The interaction between the driving torque and the load torque will produce a torque on planet carrier 24, pushing it in a clockwise direction.

Figure 3:
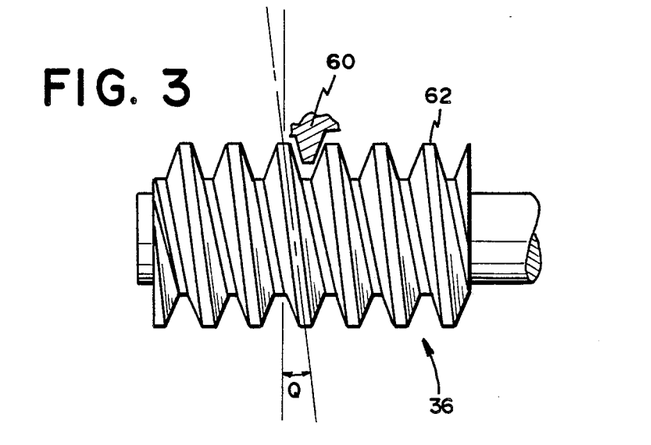
FIG. 3 is an elevation view of a worm gear adapted for use in the stepless variable ratio transmission of the present invention.
Figure 4:
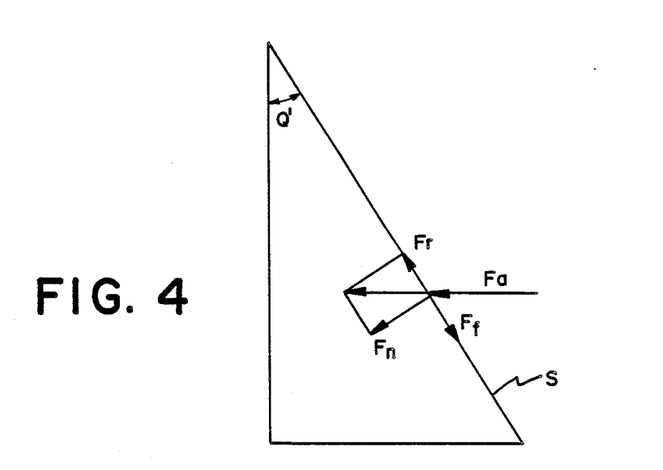
FIG. 4 is a force diagram representation of the forces acting on the worm gear by the planet carrier.

Turning now to FIGS. 3 and 4, the clockwise movement of the planet carrier 24 will result in the gear teeth 60 of planet carrier 24 moving to the left, gear tooth 60 in FIG. 3 being representative of these teeth. This movement will cause gear tooth 60 to engage worm thread 62, and the force diagram of FIG. 4 will be used to explain how the preferred thread progression or advance angle Q for the worm thread is determined. It should be noted that representative angle Q' in FIG. 4 is greater than angle Q in FIG. 3, in order to provide a more clear depiction of the forces involved.

Slope S in FIG. 4 is at angle Q' from a line normal to the axial direction of a worm, this angle representing the above-identified angle of thread advance of the worm. The force exerted by the gear teeth 60 on the worm thread 62 in the axial direction of the worm is represented by arrow $F_a$. This force will have a component $F_n$ normal to slope S, and a component $F_r$ extending along slope S, the component $F_r$ being the magnitude of force tending to rotate the worm or to advance or slide gear tooth 60 through the worm.

A frictional force $F_f$ also acts on the worm and gear tooth. The magnitude of the frictional force $F_f$ may be expressed as follows:

$$F_f = F_n \times C_f \qquad (3);$$

wherein Cf is the coefficient of friction between the gear tooth 60 and the worm thread 62. As $F_n$ equals the product of $F_a \times \cos Q'$, $C_f$ may alternatively be expressed as:

$$F_f = (F_a \times \cos Q') \times C_f \qquad (4).$$

In a like manner, the force $F_r$ tending to rotate the worm may be expressed as:

$$F_r = F_a \times \sin Q' \qquad (5).$$

It can be envisioned from FIG. 4 that if $F_r$ is less than the frictional force $F_f$ acting between the gear teeth and the worm, the worm-gear system has a self-locking characteristic, which means that the worm can drive the gear, but the gear is not able to drive the worm. This characteristic of worm gears is well known and is commonly used in worm-gear arrangements.

If, however, the force tending to rotate the worm or slide the gear tooth along the worm thread $F_r$ is greater than the frictional force $F_f$, the worm gear system is reversible, meaning that either the worm or the gear can be the driving element with the other element being the driven element.

A critical condition is encountered where the frictional force $F_f$ equals the rotational or sliding force $F_r$. In this critical condition, only a small amount of force must be applied to the worm to move the worm 36 in a direction that is in the same direction as the rotary movement urged by the axial force $F_a$. Also, only a small amount of force is required to be exerted on the worm in the opposite rotational direction to lock the gear. Using equations (4) and (5) above, this critical condition, where $F_f = F_r$, may be expressed as follows:

$$F_a \times \sin Q' = F_a \times \cos Q' \times C_f \qquad (6),$$

$$\text{thus, } \sin Q'/\cos Q' = C_f \qquad (7),$$

$$\text{or } \tan Q' = C_f \qquad (8).$$

Thus, when a worm 36 is provided having a thread progression angle resulting in the force of the gear teeth 60 being applied at angle Q=Q', and wherein tan Q=tan Q'=$C_f$, the worm 36 will require only very small amount of power to control the rotational speed of the planet carrier, and to thus steplessly vary the transmission ratio of the transmission. Further, equation (8) makes clear that the critical angle of thread progression of the worm and the meshing gear teeth of the planet carrier is independent of the magnitude of the force, $F_a$, being applied axially to the worm 36 by the gear teeth 60 of the planet carrier 24.

When the worm and gear pair (worm and planet carrier) acts on the worm at the critical angle Q', the actual power required to rotate the worm or to brake the worm (i.e. resist rotation) to control the rotational speed of the planet carrier must be sufficient to overcome only the small difference between the static and dynamic friction, or the differential friction, between the worm 36 and the meshed gear teeth 60 of the planet carrier 24. This amount of power can easily be provided by a small servo or stepping motor 46, of a type commercially available.

In practice, the worm or screw angle Q may be designed to be either slightly greater than or slightly less than the theoretical critical angle Q'. In fact, some variation in the value of the critical angle may be encountered in operation due to variations in conditions such as degree of lubrication, temperature change, and the like. This will result in a slight decrease in efficiency, due to slightly increased power demanded from the servo or stepping motor to either drive the worm 36 or brake the planet carrier 24. As a servo or stepping motor 46 usually has a higher braking torque than a driving torque, it may be desired to vary the worm or screw angle Q from the critical value Q' in order to more closely match the torque characteristics of the motor 46. Such factors are indicative that some amount of design variation will be afforded by the worm/planet carrier design of the present invention.

The efficiency of this planetary gear transmission will approach the efficiency of a simple gear train involving three axles. The maximum power loss of the system will be the intrinsic loss of the gear system plus the wattage consumed by the servo or stepping motor. The servo or stepping motor is estimated to result in a one percent loss of overall system power, compared with the prior art systems previously mentioned which are all estimated to result in losses of 20 percent or more. As an example, the use of the critical angle worm gear 36 to control the speed of the planet carrier 24 will permit the use of a one-half horsepower stepping motor to control a 100 horsepower or more gasoline engine.

Referring back to FIG. 1, it can be seen that servo or stepping motor 46 is controlled by signals from computer 48. Computer 48 itself receives signals from a speed encoder 52, which is preferably an electronic pulse generator of the optical or magnetic type attached to the input axle 14. Encoder 52 generates a series of pulses at a frequency proportional to the rotating speed of the input axle 14, which may in some instances represent the actual engine speed. The computer 48 also receives information from other sources, which could include the actual vehicle speed, the air temperature, the position of the throttle or accelerator pedal, and the torque needed to overcome the load. The computer 48, which will be provided with appropriate software, uses this information to generate and change, as necessary, a pulse frequency to drive the servo or stepping motor 46, which in turn moves the worm such that the planet carrier is moved at a rotational speed to yield a desired transmission ratio between the input and output axles.

The control software employed in the computer control may be modified to suit different parameters or conditions expected to be encountered in operation. The use of computer control in combination with the use of a servo or stepping motor 46 provides a high degree of precision control of the transmission ratio. The design of the transmission will avoid problems associated with the influence of instant impediments such as rocks or potholes on the transmission ratio, while otherwise taking into account the more steady-state conditions such as the payload, slope, wind and road conditions.

It may be desired in certain situations to replace the servo or stepping motor 46 with a different type of continuously variable speed motor. Examples of such motors are the hydrostatic, hydrodynamic, or electro-stepping-hydraulic motors. Any of these may also attain the objective of the transmission of the present invention in controlling, with a low power continuously variable speed device, a large, continuously variable ratio mechanical power transmission, by use of the device or motor in combination with the planetary gear/planet carrier/worm gear assembly of the present invention.

Figure 5:
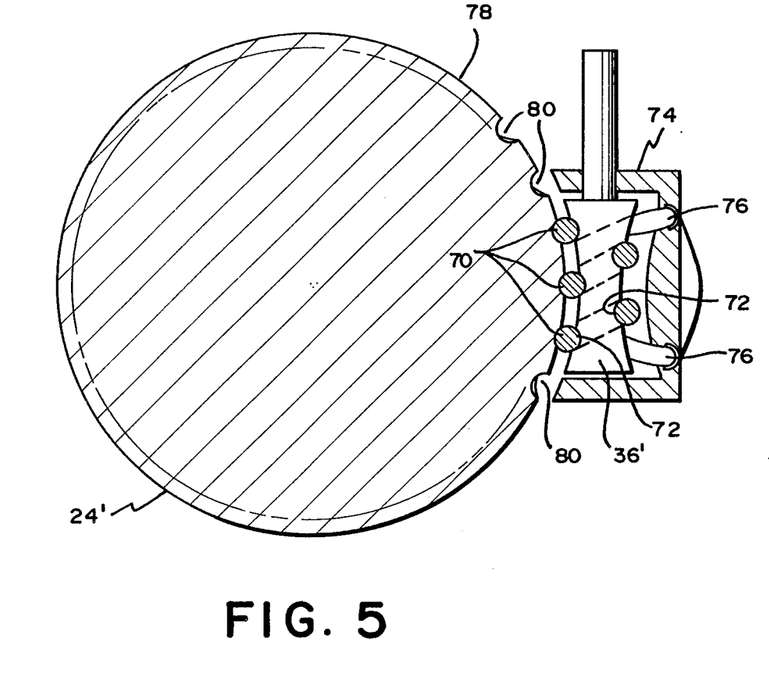
FIG. 5 is a partially schematic cross-sectional representation of an alternate embodiment for the worm gear and planet carrier of the present invention.
Figure 6:
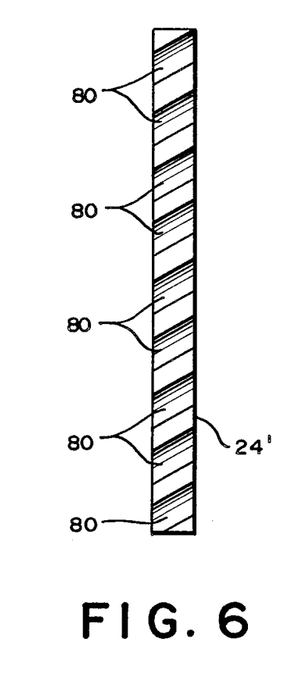
FIG. 6 is a side elevation view of the planet carrier of FIG. 5 showing the peripheral edge of the planet carrier.

FIGS. 5 and 6 depict an alternative preferred embodiment of the worm gear/planet carrier of the present invention. FIG. 5 depicts, in partial cross-section and partially schematically, a ball contact worm 36' having in place of the gear thread 62 a plurality of spherical engaging members 70. These engaging members are preferably ball bearing type elements seated in recesses 72 in worm 36', and are and partially schematically manner. The members remain in place on the worm 36' by means of a cradle 74 having tracks or races 76 on an interior surface which allow the engaging members to rotate freely, at low friction, as the worm 36' is driven.

The peripheral edge 78 of planet carrier 24' has a modified "gear tooth" arrangement specially adapted to be driven by the ball contact worm 36'. The peripheral edge 78, depicted also in side view in FIG. 6 has a progression of arcuate or semi-circular troughs 80 extending around the peripheral edge. As the worm 36' is driven or rotated, the engaging members or balls 70 come out of the races 76 in the cradle 74 and into contact with the trough 80 in planet carrier 24'. When in this position, the balls 70 are held in place in their associated recesses 72 in the spacing between the worm 36' and planet carrier 24'.

The interaction of the balls 70 and the trough 80 as the worm 36' is driven will rotate the planet carrier 24' in the same manner as in the previously described embodiment. Also, a critical condition and angle for the application of force by the planet carrier in the axial worm direction may be determined, and the ball contact worm 36' and planet carrier trough 80 may be designed to engage at the critical angle. The critical angle in this combination will generally be smaller than that of the gear thread 62 and gear tooth 60 combination in the FIG. 3 embodiment, as the friction is reduced by virtue of using ball bearing type engaging members.

An advantage which may be attained in using the ball contact worm 36' is that the amount of friction present is lower, and the differential friction (static vs. dynamic) is also reduced, compared with the FIG. 3 embodiment. As indicated previously, the power required to drive the worm is that power required to overcome the differential friction in the system. Thus, power requirements for the servo or stepping motor 46 or other continuously variable speed motor used may be even further reduced.

Various uses for the stepless variable ratio transmission of the present invention are envisioned. In addition to the previously mentioned use as an automobile transmission, the transmission will also be very useful for the continuous precision speed control of machines such as a paper mill, color printing machine, metal tape rolling mill, metal wire drawing machine, tank turret control, and the like.

While the stepless variable ratio transmission of the present invention has been illustrated and described in its preferred embodiments, various modifications and structural changes may become readily apparent to those skilled in the art, without departing in any way from the spirit and scope of the present invention. Accordingly, the scope of the present invention is to be determined by the appended claims.

I claim:

1. A stepless variable ratio transmission comprising:
    input drive means for providing power in the form of rotary movement of an axle;
    output means for transferring power from said input drive means to a predetermined load operatively coupled therewith;
    a planetary gear assembly comprising a sun gear, a ring gear and a plurality of pinion gears rotatably supported on a planet carrier, said plurality of pinion gears being meshingly engaged with said sun gear and said ring gear;

said input drive means being connected to one of said sun gear and said ring gear, and said output means being connected to the other of said sun gear and said ring gear;

means for controlling a speed of rotation of said planet carrier, said controlling means comprising worm gear and means for meshingly engaging said worm gear disposed on said planet carrier, said worm gear and said engaging means on said planet carrier being so constructed and arranged that the tangent of an angle of progression of said worm is approximately equal to a coefficient of friction between said worm gear and said engaging means of said planet carrier, said controlling means further comprising means for controlling a rotational speed of said worm gear responsive to at least a first sensed condition; and means for sensing said at least first sensed condition, said sensing means being operatively connected to said worm gear controlling means.

2. A stepless variable ratio transmission comprising:

input drive means for providing power in the form of rotary movement of an axle;

output means for transferring power from said input drive means to a predetermined load operatively coupled therewith;

a planetary gear assembly comprising a sun gear, a ring gear and a plurality of pinion gears rotatably supported on a planet carrier, said plurality of pinion gears being meshingly engaged with said sun gear and said ring gear;

said input drive means being connected to one of said sun gear and said ring gear, and said output means being connected to the other of said sun gear and said ring gear;

means for controlling a speed of rotation of said planet carrier, said controlling means comprising worm gear and means for meshingly engaging said worm gear disposed on said planet carrier, said worm gear and said engaging means on said planet carrier being so constructed and arranged that the tangent of an angle of progression of said worm is approximately equal to a coefficient of friction between said worm gear and said engaging means of said planet carrier;

wherein said worm gear has a gear thread extending in a spiral manner and said engaging means on said planet carrier comprises a plurality of gear teeth disposed around a peripheral edge and adapted to meshingly engage said gear thread; and wherein said gear thread of said worm gear has a predetermined angle of thread progression, a tangent of said predetermined angle of thread progression being substantially equal to a coefficient of friction between said gear thread and said plurality of gear teeth; and wherein said controlling means further comprises a stepping motor connected to said worm gear, said stepping motor being adapted to rotate said worm gear at a continuous range of predetermined speeds, and wherein power required to operate said stepping motor is supplied independently of said input drive means and said output means; and wherein said controlling means further comprises a computer, said computer being in communication with said stepping motor, wherein said computer is operable to send stepping pulses to said stepping motor at a substantially continuous range of frequencies to vary and control the speed of rotation of said worm gear.

3. A stepless variable ratio transmission as defined in claim 2 wherein said frequency of stepping pulses sent by said computer to said stepping motor is dependent upon at least a first sensed condition recognized by said computer.

4. A stepless variable ratio transmission as defined in claim 3 wherein said first sensed condition is an axle speed of an input axle of said input drive means.

5. A stepless variable ratio transmission as defined in claim 4 wherein said input drive means comprises an input axle, said input axle being connected to said sun gear, and wherein said output means comprises an output axle, said output axle being connected to said ring gear.

6. A stepless variable ratio transmission as defined in claim 5 wherein said frequency of stepping pulses sent by said computer to said stepping motor is dependent upon a plurality of sensed conditions.

7. A stepless variable ratio transmission as defined in claim 6 wherein said stepping motor has a power output in the range of approximately one-half to four horsepower, and wherein said input drive means power is on the order of 100 to 200 horsepower.

8. A stepless variable ratio transmission comprising:

input drive means for providing power in the form of rotary movement of an axle;

output means for transferring power from said input drive means to a predetermined load operatively coupled therewith;

a planetary gear assembly comprising a sun gear, a ring gear and a plurality of pinion gears rotatably supported on a planet carrier, said plurality of pinion gears being meshingly engaged with said sun gear and said ring gear;

said input drive means being connected to one of said sun gear and said ring gear, and said output means being connected to the other of said sun gear and said ring gear;

means for controlling a speed of rotation of said planet carrier, said controlling means comprising worm gear and means for meshingly engaging said worm gear disposed on said planet carrier, said worm gear and said engaging means on said planet carrier being so constructed and arranged that the tangent of an angle of progression of said worm is approximately equal to a coefficient of friction between said worm gear and said engaging means of said planet carrier;

wherein said worm gear has a plurality of engaging members disposed in recesses in a worm, said engaging members being spherical in shape and arranged along a surface of said worm in a spiralling manner, said worm gear further comprising a cradle adapted to retain said spherical engaging members in said recesses, and said engaging means on said planet carrier comprises a plurality of troughs disposed around a peripheral edge of said planet carrier, said plurality of troughs being adapted to meshingly engage said spherical engaging members; and wherein said plurality of spherical engaging members of said worm gear are formed in a spiral having a predetermined angle of progression, a tangent of said predetermined angle of progression being substantially equal to a coefficient of friction between said spherical engaging members and said plurality of troughs on said planet carrier; and wherein said controlling means further comprises a stepping motor connected to said worm gear, said stepping motor being adapted to rotate said worm gear at a continuous range of predetermined speeds, and wherein power required to operate said stepping motor is supplied independently of said input drive means and said output means; and wherein said controlling means further comprises a computer, said computer being in communication with said stepping motor, wherein said computer is operable to send stepping pulses to said stepping motor at a substantially continuous range of frequencies to vary and control the speed of rotation of said worm gear.

9. A stepless variable ratio transmission as defined in claim 8 wherein said frequency of stepping pulses sent by said computer to said stepping motor is dependent upon at least a first sensed condition recognized by said computer.

10. A stepless variable ration transmission as defined in claim 9 wherein said first sensed condition is an axle speed of an input axle of said input drive means.

11. A stepless variable ratio transmission as defined in claim 10 wherein said input drive means comprises an input axle, said input axle being connected to said sun gear, and wherein said output means comprises an output axle, said output axle being connected to said ring gear.

12. A stepless variable ratio transmission as defined in claim 17 wherein said frequency of stepping pulses sent by said computer to said stepping motor is dependent upon a plurality of sensed conditions.

13. A stepless variable ratio transmission as defined in claim 12 wherein said stepping motor has a power output in the range of approximately one-half to four horsepower, and wherein said input drive means power is on the order of 100 to 200 horsepower.

14. A stepless variable ratio transmission comprising:
input drive means for rotating a sun gear fixedly disposed thereon;
output means for transferring rotational energy to a predetermined load operatively connected thereto;
a planetary gear assembly comprising said sun gear, a plurality of pinion gears rotatably disposed on a planet carrier, and a ring gear surrounding said plurality of pinion gears in meshing engagement therewith, said plurality of pinion gears further being in meshing engagement with said sun gear, said ring gear of said planetary gear assembly being operatively connected to said output means; and
means for controlling a relative rotational movement of said planet carrier independently of said sun gear and said ring gear, said independent controlling means comprising a worm gear operatively connected to said planet carrier and a means for controlling a rotational speed of said worm gear responsive to at least a first sensed condition, wherein said worm gear has a predetermined angle of thread progression, a tangent of said predetermined angle being approximately equal to a coefficient of friction acting between said worm gear and said planet carrier; and
means for sensing said at least first sensed condition, said sensing means being operatively connected to said worm gear controlling means.

15. A stepless variable ratio transmission as defined in claim 14 wherein said independent controlling means further comprises means for meshingly engaging said worm gear disposed at a peripheral edge of said planet carrier.

16. A stepless variable ratio transmission as defined in claim 15 wherein said worm gear driving means comprises a computer, said computer being adapted to receive and process information from said sensing means for said first sensed condition, and said computer being adapted to drive said worm gear at varying speeds in response to said at least first sensed condition.

17. A stepless variable ratio transmission as defined in claim 16 wherein said worm gear driving means further comprises a servo motor connected to said worm gear and in communication with said computer, wherein said worm gear is driven by said servo motor at a varying rate of speed responsive to said at least first sensed condition by pulses generated by said computer and transmitted to said servo motor.

18. A stepless variable ratio automobile transmission comprising:
an input shaft;
a sun gear fixedly disposed on said input shaft;
a plurality of pinion gears rotatably mounted on a planet carrier, each of said pinion gears being adapted to meshingly engage said sun gear, said planet carrier having a plurality of gear teeth disposed on a peripheral edge surface;
a ring gear surrounding and meshingly engaging said pinion gears, said ring gear being operatively connected to an output means;
a worm gear meshingly engaging said plurality of gear teeth on said peripheral edge surface of said planet carrier, said worm gear being operatively connected to a means for rotating said worm gear, said rotating means being adapted to rotate said worm gear at a variable speed of rotation wherein an output speed of said ring gear is controlled by varying said speed of rotation of said planet carrier;
wherein said worm gear has a predetermined angle of thread progression, a tangent of said predetermined angle being approximately equal to a coefficient of friction acting between said plurality of teeth on said pinion carrier and said worm gear;
wherein said rotating means comprises a stepping motor, said stepping motor being operatively coupled to an electrical system of said automobile; and
wherein said stepping motor has a power output in the range of approximately one-half to four horsepower, and said input drive means power is on the order of 100 to 200 horsepower; and
wherein said rotating means further comprises means for sensing at least one operating condition, said sensing means being operatively coupled to said stepping motor and wherein said stepping motor rotates said worm gear in response to said at least first sensed condition.

* * * * *

UNITED STATES PATENT AND TRADEMARK OFFICE
CERTIFICATE OF CORRECTION

PATENT NO. : 4,973,295

DATED : 11/27/90

INVENTOR(S) : Paul Zi-Fang Lee

It is certified that error appears in the above-identified patent and that said Letters Patent is hereby corrected as shown below:

Columns 9-14 should be deleted to be replaced with columns 9-16, as per the attached pages.

Signed and Sealed this

Third Day of November, 1992

Attest:

DOUGLAS B. COMER

Attesting Officer

Acting Commissioner of Patents and Trademarks planet carrier 24. As a servo or stepping motor 46 usually has a higher braking torque than a driving torque, it may be desired to vary the worm or screw angle Q from the critical value Q' in order to more closely match the torque characteristics of the motor 46. Such factors are indicative that some amount of design variation will be afforded by the worm/planet carrier design of the present invention.

The efficiency of this planetary gear transmission will approach the efficiency of a simple gear train involving three axles. The maximum power loss of the system will be the intrinsic loss of the gear system plus the wattage consumed by the servo or stepping motor. The servo or stepping motor is estimated to result in a one percent loss of overall system power, compared with the prior art systems previously mentioned which are all estimated to result in losses of 20 percent or more. As an example, the use of the critical angle worm gear 36 to control the speed of the planet carrier 24 will permit the use of a one-half horsepower stepping motor to control a 100 horsepower or more gasoline engine.

Referring back to FIG. 1, it can be seen that servo or stepping motor 46 is controlled by signals from computer 48. Computer 48 itself receives signals from a speed encoder 52, which is preferably an electronic pulse generator of the optical or magnetic type attached to the input axle 14. Encoder 52 generates a series of pulses at a frequency proportional to the rotating speed of the input axle 14, which may in some instances represent the actual engine speed. The computer 48 also receives information from other sources, which could include the actual vehicle speed, the air temperature, the position of the throttle or accelerator pedal, and the torque needed to overcome the load. The computer 48, which will be provided with appropriate software, uses this information to generate and change, as necessary, a pulse frequency to drive the servo or stepping motor 46, which in turn moves the worm such that the planet carrier is moved at a rotational speed to yield a desired transmission ratio between the input and output axles.

The control software employed in the computer control may be modified to suit different parameters or conditions expected to be encountered in operation. The use of computer control in combination with the use of a servo or stepping motor 46 provides a high degree of precision control of the transmission ratio. The design of the transmission will avoid problems associated with the influence of instant impediments such as rocks or potholes on the transmission ratio, while otherwise taking into account the more steady-state conditions such as the payload, slope, wind and road conditions.

It may be desired in certain situations to replace the servo or stepping motor 46 with a different type of continuously variable speed motor. Examples of such motors are the hydrostatic, hydrodynamic, or electro-stepping-hydraulic motors. Any of these may also attain the objective of the transmission of the present invention in controlling, with a low power continuously variable speed device, a large, continuously variable ratio mechanical power transmission, by use of the device or motor in combination with the planetary gear/planet carrier/worm gear assembly of the present invention.

FIGS. 5 and 6 depict an alternative preferred embodiment of the worm gear/planet carrier of the present invention. FIG. 5 depicts, in partial cross-section and partially schematically, a ball contact worm 36' having in place of the gear thread 62 a plurality of spherical engaging members 70. These engaging members are preferably ball bearing type elements seated in recesses 72 in worm 36', and are and partially schematically manner. The members remain in place on the worm 36' by means of a cradle 74 having tracks or races 76 on an interior surface which allow the engaging members to rotate freely, at low friction, as the worm 36' is driven.

The peripheral edge 78 of planet carrier 24' has a modified "gear tooth" arrangement specially adapted to be driven by the ball contact worm 36'. The peripheral edge 78, depicted also in side view in FIG. 6 has a progression of arcuate or semi-circular troughs 80 extending around the peripheral edge. As the worm 36' is driven or rotated, the engaging members or balls 70 come out of the races 76 in the cradle 74 and into contact with the trough 80 in planet carrier 24'. When in this position, the balls 70 are held in place in their associated recesses 72 in the spacing between the worm 36' and planet carrier 24'.

The interaction of the balls 70 and the trough 80 as the worm 36' is driven will rotate the planet carrier 24' in the same manner as in the previously described embodiment. Also, a critical condition and angle for the application of force by the planet carrier in the axial worm direction may be determined, and the ball contact worm 36' and planet carrier trough 80 may be designed to engage at the critical angle. The critical angle in this combination will generally be smaller than that of the gear thread 62 and gear tooth 60 combination in the FIG. 3 embodiment, as the friction is reduced by virtue of using ball bearing type engaging members.

An advantage which may be attained in using the ball contact worm 36' is that the amount of friction present is lower, and the differential friction (static vs. dynamic) is also reduced, compared with the FIG. 3 embodiment. As indicated previously, the power required to drive the worm is that power required to overcome the differential friction in the system. Thus, power requirements for the servo or stepping motor 46 or other continuously variable speed motor used may be even further reduced.

Various uses for the stepless variable ratio transmission of the present invention are envisioned. In addition to the previously mentioned use as an automobile transmission, the transmission will also be very useful for the continuous precision speed control of machines such as a paper mill, color printing machine, metal tape rolling mill, metal wire drawing machine, tank turret control, and the like.

While the stepless variable ratio transmission of the present invention has been illustrated and described in its preferred embodiments, various modifications and structural changes may become readily apparent to those skilled in the art, without departing in any way from the spirit and scope of the present invention. Accordingly, the scope of the present invention is to be determined by the appended claims.

I claim:
1. A stepless variable ratio transmission comprising:
   input drive means for providing power in the form of rotary movement of an axle;
   output means for transferring power from said input drive means to a predetermined load operatively coupled therewith;
   a planetary gear assembly comprising a sun gear, a ring gear and a plurality of pinion gears rotatably supported on a planet carrier, said plurality of pin- ion gears being meshingly engaged with said sun gear and said ring gear;

said input drive means being connected to one of said sun gear and said ring gear, and said output means being connected to the other of said sun gear and said ring gear;

means for controlling a speed of rotation of said planet carrier, said controlling means comprising worm gear and means for meshingly engaging said worm gear disposed on said planet carrier, said worm gear and said engaging means on said planet carrier being so constructed and arranged that the tangent of an angle of progression of said worm is approximately equal to a coefficient of friction between said worm gear and said engaging means of said planet carrier, said controlling means further comprising means for controlling a rotational speed of said worm gear responsive to at least a first sensed condition; and means for sensing said at least first sensed condition, said sensing means being operatively connected to said worm gear controlling means.

2. A stepless variable ratio transmission as defined in claim 1 wherein said worm gear has a gear thread extending in a spiral manner and said engaging means on said planet carrier comprises a plurality of gear teeth disposed around a peripheral edge and adapted to meshingly engage said gear thread.

3. A stepless variable ratio transmission as defined in claim 2 wherein said gear thread of said worm gear has a predetermined angle of thread progression, a tangent of said predetermined angle of thread progression being substantially equal to a coefficient of friction between said gear thread and said plurality of gear teeth.

4. A stepless variable ratio transmission as defined in claim 3 wherein said controlling means further comprises a stepping motor connected to said worm gear, said stepping motor being adapted to rotate said worm gear at a continuous range of predetermined speeds, and wherein power required to operate said stepping motor is supplied independently of said input drive means and said output means.

5. A stepless variable ratio transmission comprising:

input drive means for providing power in the form of rotary movement of an axle;

output means for transferring power from said input drive means to a predetermined load operatively coupled therewith;

a planetary gear assembly comprising a sun gear, a ring gear and a plurality of pinion gears rotatably supported on a planet carrier, said plurality of pinion gears being meshingly engaged with said sun gear and said ring gear;

said input drive means being connected to one of said sun gear and said ring gear, and said output means being connected to the other of said sun gear and said ring gear;

means for controlling a speed of rotation of said planet carrier, said controlling means comprising worm gear and means for meshingly engaging said worm gear disposed on said planet carrier, said worm gear and said engaging means on said planet carrier being so constructed and arranged that the tangent of an angle of progression of said worm is approximately equal to a coefficient of friction between said worm gear and said engaging means of said planet carrier;

wherein said worm gear has a gear thread extending in a spiral manner and said engaging means on said planet carrier comprises a plurality of gear teeth disposed around a peripheral edge and adapted to meshingly engage said gear thread; and wherein said gear thread of said worm gear has a predetermined angle of thread progression, a tangent of said predetermined angle of thread progression being substantially equal to a coefficient of friction between said gear thread and said plurality of gear teeth; and wherein said controlling means further comprises a stepping motor connected to said worm gear, said stepping motor being adapted to rotate said worm gear at a continuous range of predetermined speeds, and wherein power required to operate said stepping motor is supplied independently of said input drive means and said output means; and wherein said controlling means further comprises a computer, said computer being in communication with said stepping motor, wherein said computer is operable to send stepping pulses to said stepping motor at a substantially continuous range of frequencies to vary and control the speed of rotation of said worm gear.

6. A stepless variable ratio transmission as defined in claim 5 wherein said frequency of stepping pulses sent by said computer to said stepping motor is dependent upon at least a first sensed condition recognized by said computer.

7. A stepless variable ratio transmission as defined in claim 6 wherein said first sensed condition is an axle speed of an input axle of said input drive means.

8. A stepless variable ratio transmission as defined in claim 7 wherein said input drive means comprises an input axle, said input axle being connected to said sun gear, and wherein said output means comprises an output axle, said output axle being connected to said ring gear.

9. A stepless variable ratio transmission as defined in claim 8 wherein said frequency of stepping pulses sent by said computer to said stepping motor is dependent upon a plurality of sensed conditions.

10. A stepless variable ratio transmission as defined in claim 9 wherein said stepping motor has a power output in the range of approximately one-half to four horsepower, and wherein said input drive means power is on the order of 100 to 200 horsepower.

11. A stepless variable ratio transmission as defined in claim 1 wherein said worm gear has a plurality of engaging members disposed in recesses in a worm, said engaging members being spherical in shape and arranged along a surface of said worm in a spiralling manner, said worm gear further comprising a cradle adapted to retain said spherical engaging members in said recesses, and said engaging means on said planet carrier comprises a plurality of troughs disposed around a peripheral edge of said planet carrier, said plurality of troughs being adapted to meshingly engage said spherical engaging members.

12. A stepless variable ratio transmission as defined in claim 11 wherein said plurality of spherical engaging members of said worm gear are formed in a spiral having a predetermined angle of progression, a tangent of said predetermined angle of progression being substantially equal to a coefficient of friction between said spherical engaging members and said plurality of troughs on said planet carrier.

13. A stepless variable ratio transmission as defined in claim 12 wherein said controlling means further comprises a stepping motor connected to said worm gear, said stepping motor being adapted to rotate said worm gear at a continuous range of predetermined speeds, and wherein power required to operate said stepping motor is supplied independently of said input drive means and said output means.

14. A stepless variable ratio transmission comprising:
input drive means for providing power in the form of rotary movement of an axle;
output means for transferring power from said input drive means to a predetermined load operatively coupled therewith;
a planetary gear assembly comprising a sun gear, a ring gear and a plurality of pinion gears rotatably supported on a planet carrier, said plurality of pinion gears being meshingly engaged with said sun gear and said ring gear;
said input drive means being connected to one of said sun gear and said ring gear, and said output means being connected to the other of said sun gear and said ring gear;
means for controlling a speed of rotation of said planet carrier, said controlling means comprising worm gear and means for meshingly engaging said worm gear disposed on said planet carrier, said worm gear and said engaging means on said planet carrier being so constructed and arranged that the tangent of an angle of progression of said worm is approximately equal to a coefficient of friction between said worm gear and said engaging means of said planet carrier;
wherein said worm gear has a plurality of engaging members disposed in recesses in a worm, said engaging members being spherical in shape and arranged along a surface of said worm in a spiralling manner, said worm gear further comprising a cradle adapted to retain said spherical engaging members in said recesses, and said engaging means on said planet carrier comprises a plurality of troughs disposed around a peripheral edge of said planet carrier, said plurality of troughs being adapted to meshingly engage said spherical engaging members; and
wherein said plurality of spherical engaging members of said worm gear are formed in a spiral having a predetermined angle of progression, a tangent of said predetermined angle of progression being substantially equal to a coefficient of friction between said spherical engaging members and said plurality of troughs on said planet carrier; and
wherein said controlling means further comprises a stepping motor connected to said worm gear, said stepping motor being adapted to rotate said worm gear at a continuous range of predetermined speeds, and wherein power required to operate said stepping motor is supplied independently of said input drive means and said output means; and
wherein said controlling means further comprises a computer, said computer being in communication with said stepping motor, wherein said computer is operable to send stepping pulses to said stepping motor at a substantially continuous range of frequencies to vary and control the speed of rotation of said worm gear.

15. A stepless variable ratio transmission as defined in claim 14 wherein said frequency of stepping pulses sent by said computer to said stepping motor is dependent upon at least a first sensed condition recognized by said computer.

16. A stepless variable ratio transmission as defined in claim 15 wherein said first sensed condition is an axle speed of an input axle of said input drive means.

17. A stepless variable ratio transmission as defined in claim 16 wherein said input drive means comprises an input axle, said input axle being connected to said sun gear, and wherein said output means comprises an output axle, said output axle being connected to said ring gear.

18. A stepless variable ratio transmission as defined in claim 17 wherein said frequency of stepping pulses sent by said computer to said stepping motor is dependent upon a plurality of sensed conditions.

19. A stepless variable ratio transmission as defined in claim 18 wherein said stepping motor has a power output in the range of approximately one-half to four horsepower, and wherein said input drive means power is on the order of 100 to 200 horsepower.

20. A stepless variable ratio transmission comprising:
input drive means for rotating a sun gear fixedly disposed thereon;
output means for transferring rotational energy to a predetermined load operatively connected thereto;
a planetary gear assembly comprising said sun gear, a plurality of pinion gears rotatably disposed on a planet carrier, and a ring gear surrounding said plurality of pinion gears in meshing engagement therewith, said plurality of pinion gears further being in meshing engagement with said sun gear, said ring gear of said planetary gear assembly being operatively connected to said output means; and
means for controlling a relative rotational movement of said planet carrier independently of said sun gear and said ring gear, said independent controlling means comprising a worm gear operatively connected to said planet carrier and a means for controlling a rotational speed of said worm gear responsive to at least a first sensed condition, wherein said worm gear has a predetermined angle of thread progression, a tangent of said predetermined angle being approximately equal to a coefficient of friction acting between said worm gear and said planet carrier; and
means for sensing said at least first sensed condition, said sensing means being operatively connected to said worm gear controlling means.

21. A stepless variable ratio transmission as defined in claim 20 wherein said independent controlling means further comprises means for meshingly engaging said worm gear disposed at a peripheral edge of said planet carrier.

22. A stepless variable ratio transmission as defined in claim 21 wherein said worm gear driving means comprises a computer, said computer being adapted to receive and process information from said sensing means for said first sensed condition, and said computer being adapted to drive said worm gear at varying speeds in response to said at least first sensed condition.

23. A stepless variable ratio transmission as defined in claim 22 wherein said worm gear driving means further comprises a servo motor connected to said worm gear and in communication with said computer, wherein said worm gear is driven by said servo motor at a varying rate of speed responsive to said at least first sensed condition by pulses generated by said computer and transmitted to said servo motor.

24. A stepless variable ratio automobile transmission comprising:
an input shaft;
a sun gear fixedly disposed on said input shaft;
a plurality of pinion gears rotatably mounted on a planet carrier, each of said pinion gears being adapted to meshingly engage said sun gear, said planet carrier having a plurality of gear teeth disposed on a peripheral edge surface;
a ring gear surrounding and meshingly engaging said pinion gears, said ring gear being operatively connected to an output means;
a worm gear meshingly engaging said plurality of gear teeth on said peripheral edge surface of said planet carrier, said worm gear being operatively connected to a means for rotating said worm gear;
said rotating means being adapted to rotate said worm gear at a variable speed of rotation wherein an output speed of said ring gear is controlled by varying said speed of rotation of said planet carrier;
wherein said worm gear has a predetermined angle of thread progression, a tangent of said predetermined angle being approximately equal to a coefficient of friction acting between said plurality of teeth on said pinion carrier and said worm gear;
wherein said rotating means comprises a stepping motor, said stepping motor being operatively coupled to an electrical system of said automobile; and
wherein said stepping motor has a power output in the range of approximately one-half to four horsepower, and said input drive means power is on the order of 100 to 200 horsepower; and
wherein said rotating means further comprises means for sensing at least one operating condition, said sensing means being operatively coupled to said stepping motor and wherein said stepping motor rotates said worm gear in response to said at least first sensed condition.

* * * * *